UNITED STATES PATENT OFFICE.

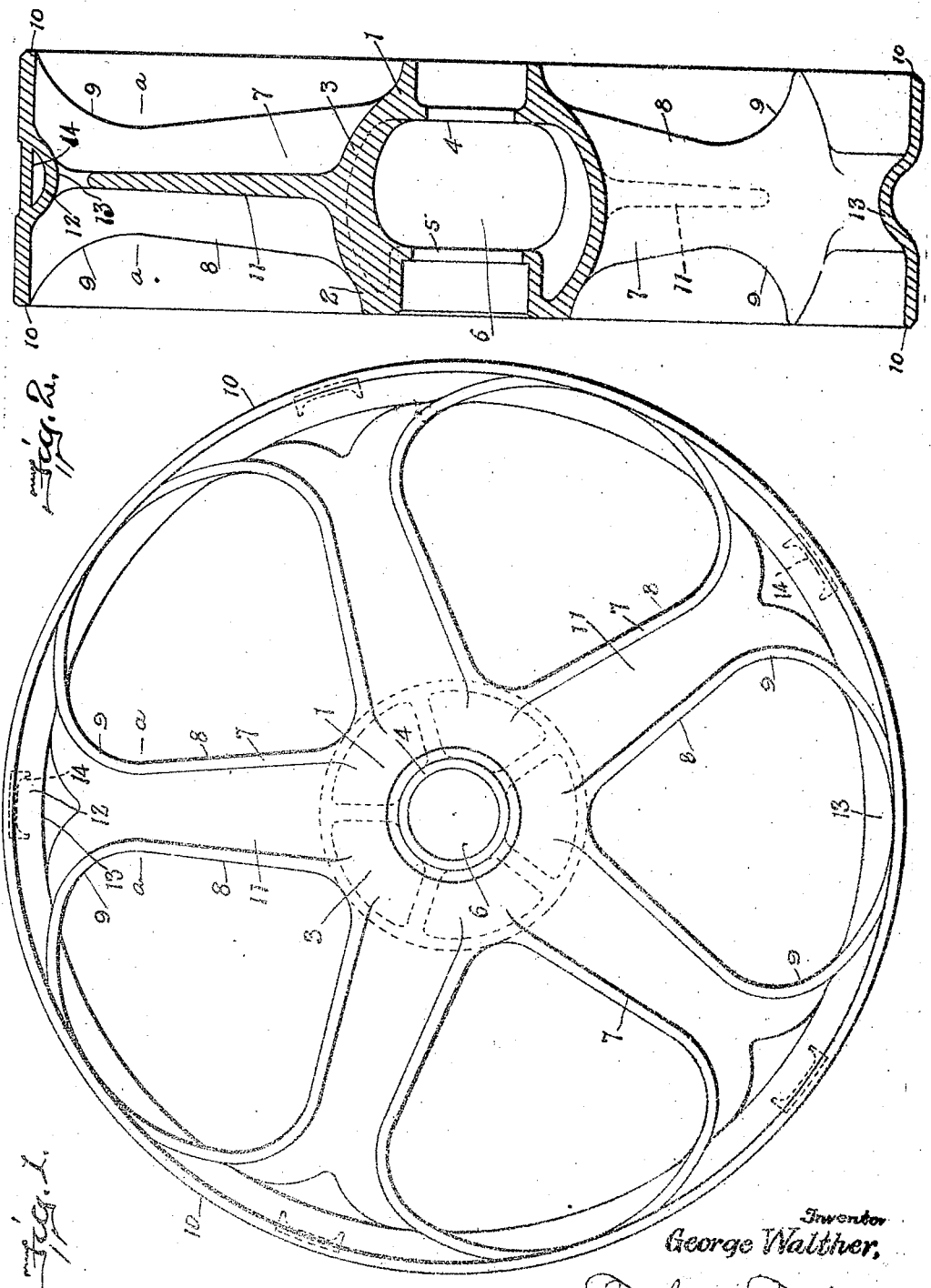

GEORGE WALTHER, OF DAYTON, OHIO, ASSIGNOR TO THE DAYTON STEEL FOUNDRY COMPANY, OF DAYTON, OHIO, A CORPORATION OF OHIO.

WHEEL.

1,346,865.   Specification of Letters Patent.   Patented July 20, 1920.

Application filed May 19, 1919. Serial No. 297,996.

*To all whom it may concern:*

Be it known that I, GEORGE WALTHER, a citizen of the United States, residing at Dayton, in the county of Montgomery and State of Ohio, have invented certain new and useful Improvements in Wheels, of which the following is a specification, reference being had therein to the accompanying drawing.

This invention relates to steel wheels of the general type shown in Patent #1,120,256 issued to me December 8, 1914, and has for its particular object to provide an improved wheel designed especially to obtain the maximum in strength and resiliency with the minimum in weight.

It is an object in the present invention to provide a wheel having channeled spokes, of any suitable shape, preferably of the I-beam shape, and to so relate the spokes to the hub and rim of the wheel that wheel shocks or stresses will be evenly distributed and absorbed to a considerable extent through the wheel.

It is a further object to provide a wheel of the general character described self-cleaning in design, *i. e.*, a construction that will not readily retain loose soil and carry it with the wheel in the operation thereof.

Also, as in my earlier inventions, it is an object in the present invention to provide a wheel construction well adapted to molding operations, the wheels being cast, preferably, in steel of any suitable composition, so that the loss or waste due to defective castings will be minimized.

In the accompanying drawings:—

Figure 1 is a side elevation, partly in section, of the wheel, and

Fig. 2 is a cross sectional view taken substantially centrally through the wheel.

As here shown the wheel consists of the usual elements of hub, spokes and rim, the hub being substantially of the same construction as the wheel of the patent referred to, consisting of the oppositely disposed hub extensions 1 and 2 and an intermediate enlarged central portion or spoke section 3. The hub consists further of inwardly extending flanges 4 and 5 forming an annular chamber 6 within the hub bearing aperture.

The spokes 7, as here shown, are of I-beam formation in cross section, the flanges 8—8 thereof curving laterally to meet the corresponding curved portions of the adjacent spokes. The flanges are tapered or inclined toward each other outwardly from the hubs to a point indicated by an imaginary line *a—a*, and then spread outwardly in sharp curves 9—9 to form the juncture with the rims 10—10 of the wheel. The web portion 11 of the spokes extends substantially at right angles centrally between the flanges 8—8 and spreads laterally at its outer end, following the curve of the spreading ends of the flanges.

The rim or felly of the wheel consists of the oppositely disposed rims 10—10 joined together at their inner edges by a series of annular channels or depressions 12, the outer walls of which form a series of angular shaped ribs 13 disposed between the spokes and having their opposite faces inclined toward the outer edges of the rims 10—10, thus forming a self-cleaning surface of the inner side of the rims between the spokes. Longitudinally adjacent the spokes transverse cross bars 14 are disposed between the rims 10—10.

While the I-beam shape is the preferred form of the spokes, other suitable channel forms may be employed with a rim construction of the character described, and I do not wish to be limited therefore to the exact construction and arrangement shown except as defined and comprehended in the appended claims.

Having thus fully described my invention, what I claim as new and desire to secure by Letters Patent, is:—

1. A metal wheel consisting of a hollow hub, channeled spokes and a rim, said spokes being tapered outwardly from the hub, and having a portion thereof curved laterally at their inner ends to meet a corresponding portion of an adjacent spoke, a portion at their outer ends curved laterally to form the juncture with the rim of the wheel, and a portion extending radially from the hub between the curved portions of the spokes.

2. A metal wheel consisting of a hollow hub, channeled spokes and a rim, said spokes being tapered outwardly from the hub, and having a portion thereof curved laterally at their inner ends to meet a corresponding portion of an adjacent spoke, and a portion at their outer ends curved laterally to form the juncture with the rim of the wheel.

3. A metal wheel consisting of a hollow hub, channeled spokes and a rim, said spokes being tapered outwardly from the hub, a portion at the outer ends thereof being curved laterally to form the juncture with the rim of the wheel, and a portion extending radially from the hub between the curved portions of the spokes.

4. A metal wheel consisting of a hollow hub, spokes and a rim, said spokes being of I-beam formation in cross section and having the flange portions thereof curved at their inner ends to meet the flanges of adjacent spokes, and widened and curved oppositely at their outer ends to form the juncture with the rim of the wheel; the web portion of the hub being spread to conform to the curvature of said flanges.

5. A wheel consisting of a hollow hub, I-beam spokes and oppositely disposed rims joined together at their inner edges by a series of channels extending longitudinally between the rims, and by a corresponding series of cross bars disposed between said channels.

6. A wheel consisting of a hollow hub, I-beam spokes and oppositely disposed rims joined together at their inner edges by a series of channels extending longitudinally between the rims.

7. A wheel consisting of a hollow hub, I-beam spokes and oppositely disposed rims joined together at their inner edges by a series of channels extending longitudinally between the rims; the flanges of the spokes being spread apart and curved outwardly to merge with said rims, and the web of the spokes being spread between said curved portions and merged with the walls of said channels.

8. A wheel consisting of a hollow hub, I-beam spokes and oppositely disposed rims joined together at their inner edges by a series of channels extending longitudinally between the rims; the flanges of the spokes being spread apart and curved outwardly to merge with said rims.

9. A wheel consisting of a hollow hub, spokes and rim, said spokes being I-beam shaped in cross section and having the flanges thereof widened adjacent the hub and rims and curved outwardly and the web thereof spread between said curved portions.

In testimony whereof, I affix my signature.

GEORGE WALTHER.